United States Patent [19]

Marinoni

[11] Patent Number: 4,881,296
[45] Date of Patent: Nov. 21, 1989

[54] VARIABLE HINGE FOR A DOOR OR WINDOW

[75] Inventor: Mario Marinoni, Magenta, Italy
[73] Assignee: Casma S.p.A., Magenta, Italy
[21] Appl. No.: 305,909
[22] Filed: Feb. 3, 1989

[30] Foreign Application Priority Data

Feb. 18, 1988 [DE] Fed. Rep. of Germany ....... 3805095

[51] Int. Cl.⁴ .............................................. E05D 7/04
[52] U.S. Cl. ........................................ 16/237; 16/243;
    16/248; 16/249; 16/254; 16/382; 16/DIG. 40
[58] Field of Search ................. 16/235, 236, 237, 243,
    16/248, 249, 254, 382, DIG. 40; 403/408.1

[56] References Cited

U.S. PATENT DOCUMENTS 3,053,355  9/1962  Attwood ................................ 189/36
3,908,330  9/1975  Frach et al. ....................... 52/758 F

FOREIGN PATENT DOCUMENTS 2421587  12/1982  Fed. Rep. of Germany .
2436844   8/1985  Fed. Rep. of Germany .

*Primary Examiner*—Richard K. Seidel
*Assistant Examiner*—Edward A. Brown
*Attorney, Agent, or Firm*—Foley & Lardner, Schwartz, Jeffery, Schwaab, Mack, Blumenthal & Evans

[57] ABSTRACT

The invention relates to a mounting for a door or window, especially an all-glass door or an all-glass window. A vertical frame piece provides a vertically extending receiving space accessible via a vertical slit for an anchor with an internal thread. A screw penetrating a hinge part is screwed into this thread. The anchor has a transverse dimension smaller than the width of the slit and a longitudinal dimension greater than the width of the slit. A friction drive member for the anchor is located in the slit and penetrated by the screw.

3 Claims, 3 Drawing Sheets

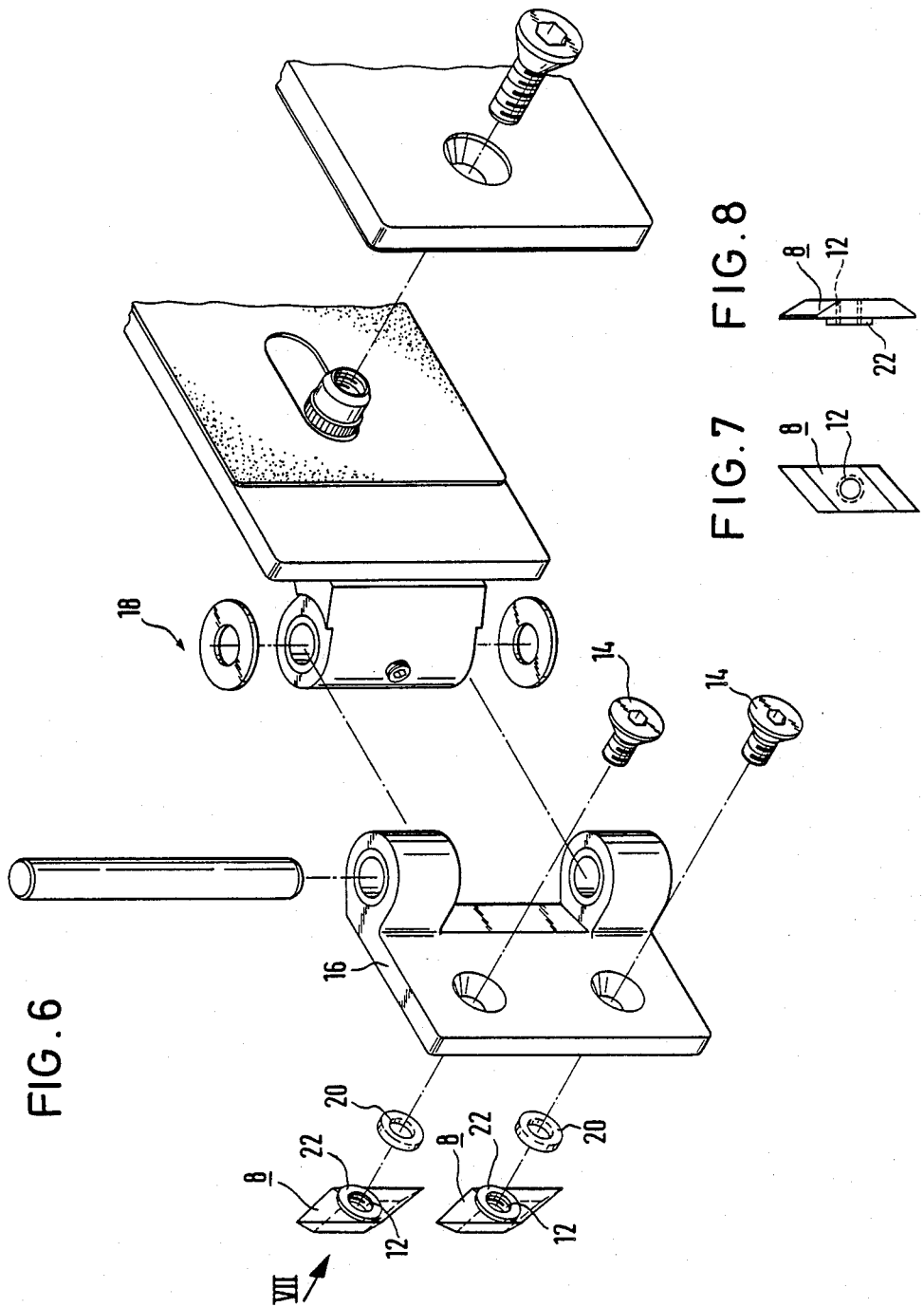

VARIABLE HINGE FOR A DOOR OR WINDOW

BACKGROUND OF THE INVENTION

The present invention relates to a mounting for a covering for an opening such as a door or a window.

In known doors and windows, the hinge part to be fixed to the frame piece has to correspond in its form to the sectional shape of the frame piece. It is not possible to use the same hinge part for frame pieces with significantly different sectional shapes.

Moreover, in most cases, the fastening members of known hinge parts have to be inserted from above or below into the section of the frame piece before installation of the frame piece in the opening. Such installation is very troublesome. If the frame piece is already installed, when the door is being mounted, the fitter is compelled either to dismantle the frame piece or to cut two openings into the frame piece above or below the intended position of the two hinge parts. It is only through these openings that the hinge parts can be inserted into the frame piece and fixed in the intended position. This assembly is very costly, especially since the cut openings have to be filled after installation to provide an attractive appearance.

SUMMARY OF THE INVENTION

It is therefore an object of the present invention to simplify the assembly of the door or the window without necessitating any cutting of the frame piece.

Another object of the present invention is to provide a fastening for a hinge part which accommodates different sectional shapes of various frame pieces.

In accomplishing the foregoing objects, there has been provided, in accordance with one aspect of the present invention, a mounting for a covering for an opening, comprising a vertical frame piece which provides a vertically extending receiving space, said space being accessible through a vertical slit; an anchor member located within said receiving space, said anchor member having an internal thread, a transverse dimension smaller than the width of the slit, and a longitudinal dimension greater than the width of the slit; a hinge attached to said anchor member via attaching means for engaging said internal thread; and a friction drive member which contacts said anchor member and is penetrated by the screw, said friction drive member comprising an elastomeric O-ring provided in the slit and an annular collar contacting the internal thread of said anchor member, said annular collar having an external diameter smaller than the width of the slit, wherein the sum of the thickness of the annular collar and the thickness of the O-ring is greater than the depth of the slit.

Other objects, features and advantages of the present invention will become apparent from the following detailed description. It should be understood, however, that the detailed description and the specific examples, while indicating preferred embodiments of the invention, are given by way of illustration only, since various changes and modifications will become apparent to those skilled in the art from this detailed description.

BRIEF DESCRIPTION OF THE DRAWINGS

FIG. 6 shows an exploded view of a variable hinge according to the present invention.

FIG. 7 shows the anchor of FIG. 6, as seen along line VII.

FIG. 8 shows a side view of the anchor according to FIG. 7.

DETAILED DESCRIPTION OF THE PREFERRED EMBODIMENTS

Figure 1:
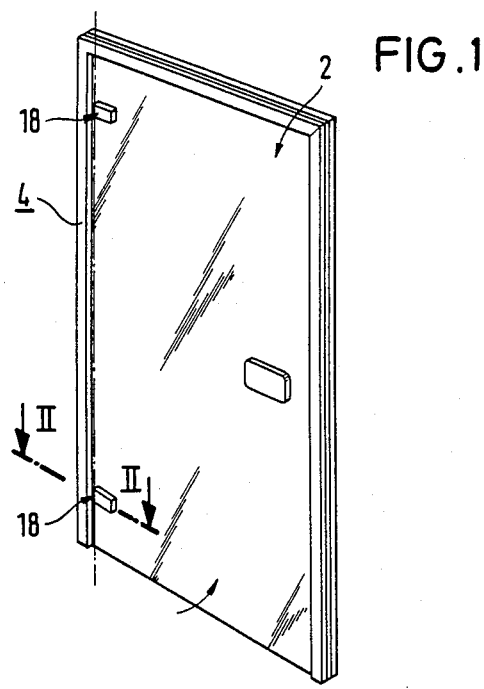
FIG. 1 shows an all-glass door in a frame with two variable hinges according to the present invention.

A mounting is provided with an anchor which is positioned in such a way that it can be inserted through the vertical slit of the door or window frame. A screw passes through a hinge part attached to the door. During tightening of the screw, the anchor turns by friction drive and engages the slit on both sides. Upon further tightening of the screw, the anchor is secured in the receiving space. The position of the anchor can also be adjusted without difficulty. Accordingly, the present invention allows the hinge part to be attached to the frame piece without having to cut an opening.

In the following description, and in the accompanying drawings, like reference numerals, as used among the various figures of the drawings, refer to like features or elements among the various figures and embodiments.

Figure 2:
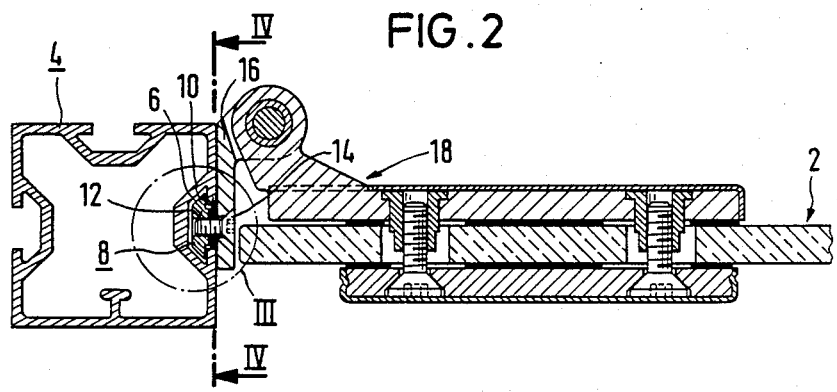
FIG. 2 shows a section along line II—II in FIG. 1.
Figure 3:
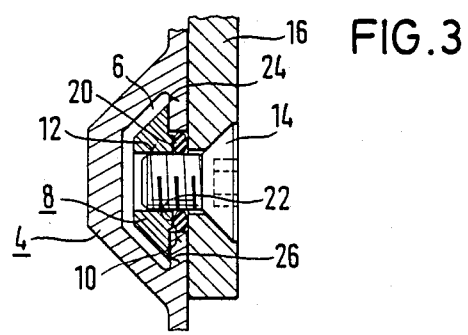
FIG. 3 shows the area III in FIG. 2 enlarged.
Figure 4:
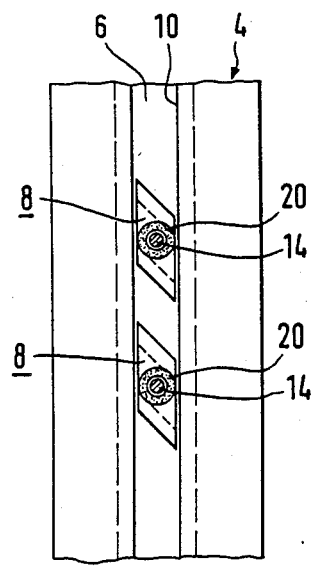
FIG. 4 shows a section along line IV—IV in FIG. 2.

Referring to FIG. 1, a covering 2 for an opening has an associated vertical frame piece 4. Covering 2 may be a door or a window and may also be all-glass. Referring now to FIG. 2, frame piece 4 is a hollow section and has a vertically extending receiving space 6 for anchor 8. The receiving space 6 is accessible via a vertical slit 10. The anchors 8 may be a parallelogram or diamond-shaped with a transverse dimension fitting in the slit 10, as is apparent from FIG. 4. Each anchor 8 has an internal thread 12 to accommodate a screw 14. Screw 14 passes through a hinge part 16 of a door hinge 18. Door hinge 18 is fitted to covering 2.

An O-ring 20 is fitted on screw 14. O-ring 20 has a diameter slightly less than the width of slit 10 and fits into slit 10. O-ring 20 may be composed of an elastomeric material. On the side of the slit 10, anchor 8 has an annular collar 22 contacting its internal thread 12, such that collar 22 is located between O-ring 20 and anchor 8. Annular collar 22 has an outer diameter somewhat smaller than the width of the slit 10 and thus fits into the slit 10. The total of the thickness of the annular collar 22 and the thickness of the 0-ring 20 is somewhat greater than the depth of the slit 10.

Figure 5:
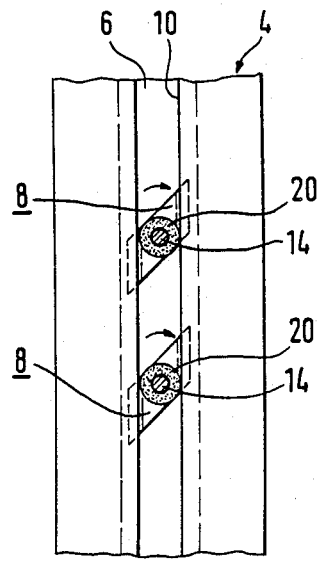
FIG. 5 shows the section according to FIG. 4 with secured anchors.

When screw 14 is initially tightened, the anchor 8 is rotated into position by the interplay between O-ring 20 and annular collar 22, as illustrated in FIG. 5. The longitudinal dimension of anchor 8 is greater than the width of slit 10. Thus, anchor 8 engages both sides of slit 10 on the inside of the receiving space 6, i.e., at surfaces 24 and 26. When the screw 14 is further tightened, the anchor 8 is pulled tightly to the surfaces 24 and 26, thereby securing the hinge part 16.

Anchor 8 is easily relocated along slit 10 by loosening screw 14 and locating anchor 8 at the desired location along slit 10. In a preferred embodiment the anchor 8 may have run-up slopes (not illustrated) which facilitate the engagement of anchor 8 with surfaces 24 and 26 when anchor 8 is rotated into position as illustrated in FIG. 5.

Figure 9:
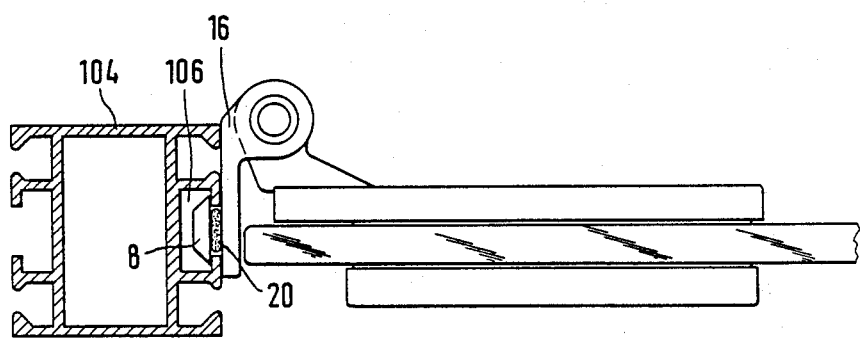
FIG. 9 shows the fastening of a hinge part in a section different from the section depicted in FIG. 2.

FIG. 9 shows a frame-section 104 with a slightly different receiving space 106. As is apparent, the same anchor 8 may be used for the securing of the hinge part 16 to the frame section 104.

What is claimed is:

1. A mounting for a covering for an opening, comprising:
   a vertical frame piece which provides a vertically extending receiving space, said space being accessible through a vertical slit;
   an anchor member located within said receiving space, said anchor member having an internal thread, a transverse dimension smaller than the width of the slit, and a longitudinal dimension greater than the width of the slit;
   a hinge attached to said anchor member via attaching means for engaging said internal thread; and
   a friction drive member which contacts said anchor member and is penetrated by the screw, said friction drive member comprising an elastomeric O-ring provided in the slit and an annular collar contacting the internal thread of said anchor member, said annular collar having an external diameter smaller than the width of the slit, wherein the sum of the thickness of the annular collar and the thickness of the O-ring is greater than the depth of the slit.

2. A mounting according to claim 1, wherein the said anchor member has a cross section represented by a parallelogram.

3. A mounting according to claim 1, wherein said anchor member has run-up slopes associated with inner surfaces of the receiving space, wherein said inner surfaces border on the slit.

* * * * *